(12) United States Patent
Banerjee et al.

(10) Patent No.: US 11,008,240 B2
(45) Date of Patent: May 18, 2021

(54) PROCESS FOR REDUCTION OF SULFIDE FROM WATER AND WASTEWATER

(71) Applicant: Veolia Water Solutions & Technologies Support, Saint-Maurice (FR)

(72) Inventors: Kashi Banerjee, Moon Township, PA (US); Srikanth Muddasani, Pittsburgh, PA (US); David E. Parker, Pittsburgh, PA (US); Bernard Roy Mack, Natick, MA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 466 days.

(21) Appl. No.: 16/077,867

(22) PCT Filed: Feb. 15, 2017

(86) PCT No.: PCT/US2017/017896
§ 371 (c)(1),
(2) Date: Aug. 14, 2018

(87) PCT Pub. No.: WO2017/142899
PCT Pub. Date: Aug. 24, 2017

(65) Prior Publication Data
US 2020/0290910 A1    Sep. 17, 2020

Related U.S. Application Data

(60) Provisional application No. 62/295,182, filed on Feb. 15, 2016.

(51) Int. Cl.
*C02F 9/00* (2006.01)
*B01J 23/745* (2006.01)
(Continued)

(52) U.S. Cl.
CPC ............... *C02F 9/00* (2013.01); *B01J 23/745* (2013.01); *C02F 1/004* (2013.01); *C02F 1/44* (2013.01);
(Continued)

(58) Field of Classification Search
None
See application file for complete search history.

(56) References Cited

U.S. PATENT DOCUMENTS

2002/0189998 A1    12/2002  Haase
2004/0180424 A1     9/2004  Christiansen
(Continued)

FOREIGN PATENT DOCUMENTS

CL    2012003669 A1    8/2013
CN       1196336 A    10/1998
(Continued)

*Primary Examiner* — Chester T Barry
(74) *Attorney, Agent, or Firm* — Coats & Bennett PLLC

(57) ABSTRACT

The instant application is directed towards methods for removing sulfide from a wastewater stream. The pH of the wastewater stream is adjusted to between 7.0 and 8.0. A first oxidizing agent is mixed with the wastewater stream, oxidizing the sulfide to elemental sulfur. The wastewater stream is then softened by mixing lime with the wastewater stream. The addition of lime further raises the pH of the wastewater stream to 10.0 or higher, and converts the elemental sulfur to soluble sulfide (S2-) and/or thio-sulfate. Calcium carbonate is precipitated and sulfide (S2-) and/or thio-sulfate is adsorbed thereon. Thereafter, the wastewater stream is directed to a solids-liquid separation process, which separates the calcium carbonate and adsorbed sulfide (S2-) and/or thio-sulfate from the wastewater stream. The solids-liquid separator produces an effluent that includes residual elemental sulfur. The effluent is then mixed with a second
(Continued)

oxidizing agent, which oxidizes the residual elemental sulfur to sulfate, producing a treated effluent.

14 Claims, 3 Drawing Sheets

(51) Int. Cl.
 *C02F 1/00* (2006.01)
 *C02F 1/44* (2006.01)
 *C02F 1/50* (2006.01)
 *C02F 1/66* (2006.01)
 *C02F 1/72* (2006.01)
 *C02F 5/06* (2006.01)
 *C02F 101/10* (2006.01)
 *C02F 101/16* (2006.01)

(52) U.S. Cl.
 CPC .................................... *C02F 1/50* (2013.01); *C02F 1/66* (2013.01); *C02F 1/722* (2013.01); *C02F 1/725* (2013.01); *C02F 5/06* (2013.01); *C02F 2101/101* (2013.01); *C02F 2101/16* (2013.01); *C02F 2301/046* (2013.01); *C02F 2303/04* (2013.01); *C02F 2303/22* (2013.01)

(56) References Cited

U.S. PATENT DOCUMENTS

2009/0173692 A1* 7/2009 Laraway ............... B01D 61/58
 210/638
2015/0013987 A1 1/2015 Underwood

FOREIGN PATENT DOCUMENTS

| | | |
|---|---|---|
| CN | 101638279 A | 2/2010 |
| CN | 103241862 A | 8/2013 |
| CN | 105585198 A | 5/2016 |
| CN | 106396185 A | 2/2017 |
| DE | 102010011715 A1 | 9/2011 |
| EP | 0803279 A1 | 10/1997 |
| WO | 2011163451 A1 | 12/2011 |

* cited by examiner

PROCESS FOR REDUCTION OF SULFIDE FROM WATER AND WASTEWATER

RELATED APPLICATIONS

The present application is a U.S. National Stage Application of PCT Application No. PCT/US2017/017896, with an international filing date of Feb. 25, 2017. Applicant claims priority based on U.S. Patent Application No. 62/295,182 filed Feb. 15, 2016. The subject matter of these applications is incorporated herein in their entirety.

TECHNICAL FIELD

This application is directed to the treatment of water and wastewater.

BACKGROUND

Natural and industrial processes produce sulfide in the environment. Sulfide found in the nature is primarily produced by biological process under anaerobic conditions and exists as free hydrogen sulfide ($H_2S$) at pH below 7.0. Under alkaline condition, it exists as bisulfide ($HS^-$)/sulfide ($S^{2-}$) ions. Biogenic $H_2S$ is encountered in groundwater, swamp and marshes, sewage, natural gas deposit, etc. Sources of sulfide in wastewater from industry include coal processing, oil and gas refining, and metals and mining operations. From aesthetic, health, ecological, and industrial view points, sulfide containing water must be treated carefully prior to discharge. Furthermore, with the increasing interest in water reuse, membrane (NF/RO) processes are becoming very popular. Elemental sulfur produced from sulfide is a potential threat for membrane fouling. In order to protect membrane, sulfide must be reduced to a very low level (preferably to non-detect), prior to the membrane process.

Several sulfide treatment alternatives including stripping, oxidation with chlorine, hydrogen peroxide, ozone, permanganate; chemical precipitation, adsorption, and biological processes are available. Each process has a niche guided by the water quality, flow, process objectives, and applicability. Because of convenience, process reliability, and flexibility, chemical oxidation with hydrogen peroxide is becoming popular. However, in order for complete oxidation of sulfide to sulfate, a high dosage of hydrogen peroxide is required, which often makes the process economically unfavorable. Accordingly, there is a need for an improved cost effective method which would oxidize sulfide to sulfate without generating any elemental sulfur.

SUMMARY

The instant application is directed towards methods for removing sulfide from a wastewater stream. In one embodiment, the pH of the wastewater stream is adjusted to between 7.0 and 8.0. A first oxidizing agent is mixed with the wastewater stream, oxidizing the sulfide to elemental sulfur. The wastewater stream is then softened by mixing lime with the wastewater stream. The addition of lime further raises the pH of the wastewater stream to 10.0 or higher, and converts the elemental sulfur to soluble sulfide ($S^{2-}$) and/or thio-sulfate. Calcium carbonate is precipitated and sulfide ($S^{2-}$) and/or thio-sulfate is adsorbed thereon. Thereafter, the wastewater stream is directed to a solids-liquid separation process, which separates the calcium carbonate and adsorbed sulfide ($S^{2-}$) and/or thio-sulfate from the wastewater stream. The solids-liquid separator produces an effluent that includes residual elemental sulfur (usually expressed as $S^{2-}$ under alkaline condition). The effluent is then mixed with a second oxidizing agent, which oxidizes the residual elemental sulfur to sulfate, producing a treated effluent.

In another embodiment, a two-step oxidation process for removing sulfide from a wastewater stream is provided. In the first step, an oxidation reagent is mixed with the wastewater stream. At least some of the sulfide is oxidized to elemental sulfur. Thereafter, a softening reagent is added to the wastewater stream. The softening agent increases the pH of the wastewater stream. The increase in pH converts the elemental sulfur to soluble sulfide ($S^{2-}$) and/or thio-sulfate, and causes hardness compounds to precipitate. Soluble sulfide and/or thio-sulfate thereafter adsorbs onto the hardness compound. After the first step, the wastewater stream is directed to a solids-liquid separator. The solids-liquid separator removes the hardness compound having the sulfide and/or thio-sulfate adsorbed thereon and producing an effluent that includes residual elemental sulfur. In the second step, an oxidizing reagent is mixed with the effluent from the solids-liquid separator, causing the residual elemental sulfur to be converted to sulfate. After the second step, the wastewater stream may be further treated or discharged.

DETAILED DESCRIPTION

The objective of this invention is to develop a cost effective sulfide treatment technology. The basic concept includes a two-step oxidation process which would oxidize sulfide to sulfate; calcium and magnesium removal by lime-soda softening; removal of elemental sulfur generated in the $1^{st}$ step oxidation process by adsorption onto calcium carbonate sludge produced during the softening; complete oxidation of residual sulfide to sulfate in the $2^{nd}$ step oxidation process; post neutralization; sludge treatment and disposal.

One of the novel features of this invention is to completely remove sulfide from the water in a cost effective manner. The other novel feature is to protect the RO/NF membrane from sulfur/sulfide fouling by completely removing this contaminant by the oxidation as well as by the co-precipitation and adsorption process (adsorption onto CaCO3 sludge formed in the softening process).

Figure 1:
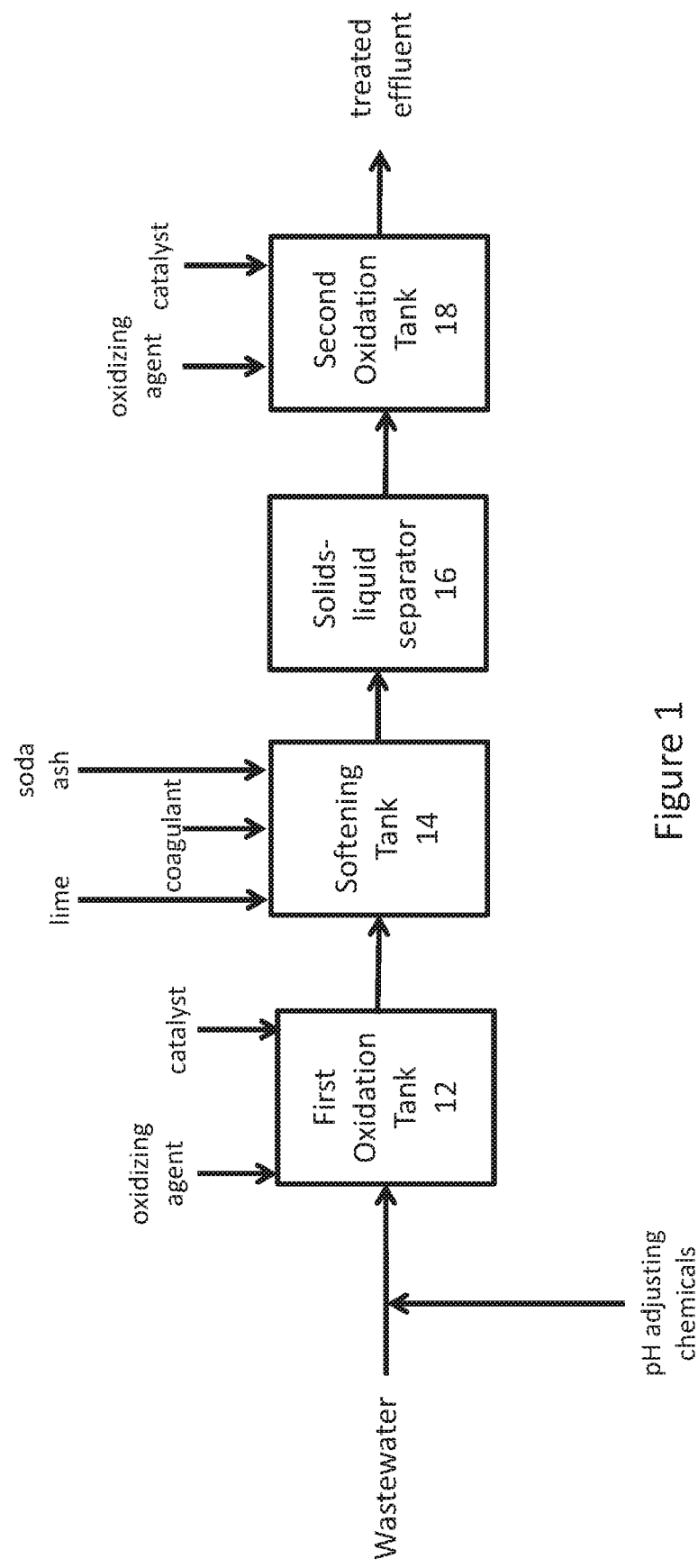
FIG. 1 depicts one embodiment of the methods described herein.

Turning to the figures, FIG. 1 depicts one embodiment 10 of the methods disclosed herein. A wastewater containing sulfide is provided. If the pH of the wastewater is outside the range of 7.0 to 8.0, it is adjusted to 7.0 to 8.0. The wastewater is directed to a first oxidation tank 12. In a preferred embodiment, first oxidation tank 12 is a closed top tank with a vent connection for the exhaust gas. In the first oxidation tank 12, the wastewater is mixed with hydrogen peroxide. In a preferred embodiment, the weight ratio between peroxide and sulfide is 0.8:1. Furthermore, an iron catalyst may be added in first oxidation tank 12. In some embodiments, the iron catalyst is ferric chloride or ferric sulfate.

The sulfide in the wastewater is oxidized by the hydrogen peroxide in the presence of the iron catalyst to elemental sulfur. Some sulfate may also be produced. The objective of adding iron as a catalyst is to enhance the oxidation reaction kinetics. Thus, the chemical reaction in the $1^{st}$ stage oxidation process, at pH 7.0-8.0, is:

$$H_2S + H_2O_2 \rightarrow S^0 + 2H_2O$$

The effluent from the first oxidation tank 12 is directed to a softening tank 14. Lime is added to softening tank 14 to adjust the pH above 10, and preferably between 10.0 and 10.5. In some embodiments, soda ash may also be added. The addition of lime to softening tank 14 further causes calcium carbonate ($CaCO_3$) to precipitate. In some embodiments, magnesium hydroxide ($Mg(OH)_2$) precipitates or co-precipitates with the calcium carbonate. In some embodiments, the wastewater may further include magnesium, which may be removed via precipitation by adjusting the pH in softening tank 14 to between 10.8 and 11.2.

Under alkaline conditions, insoluble elemental sulfur produced in first oxidation tank 12 will be converted to soluble sulfide ($S^{2-}$) and thio-sulfate in softening tank 14. The soluble sulfide and thio-sulfate are adsorbed onto the $CaCO_3$ or $Mg(OH)_2$ sludge. The concentrations of sulfide and thio-sulfate depend on the raw water quality and hydrogen peroxide dosage. The contents of softening tank 14 are directed to a separator 16. In a preferred embodiment, separator 16 is a clarifier. In some embodiments, softening tank 14 and separator 16 may be combined in a single softening clarifier unit. Separator 16 separates the precipitated sludge and produces an effluent.

The effluent from the separator 16 is directed to a second oxidation tank 18. Hydrogen peroxide is added to second oxidation tank 18. In some embodiments, an iron catalyst may also be added to second oxidation tank 18. It is noted that no additional benefit of adding an iron catalyst was observed for wastewaters with a pH above 10.5. In second oxidation tank 18, oxidation of residual elemental sulfur (expressed as sulfide ion under alkaline condition) to sulfate occurs by following the reaction:

$$S^{2-} + 4H_2O_2 \rightarrow SO_4^{2-} + 4H_2O$$

In some embodiments, the recommended weight ratio of $H_2O_2$ to sulfide is between 5:1 and 6.1. However, the ratio depends on the water quality.

Figure 2:
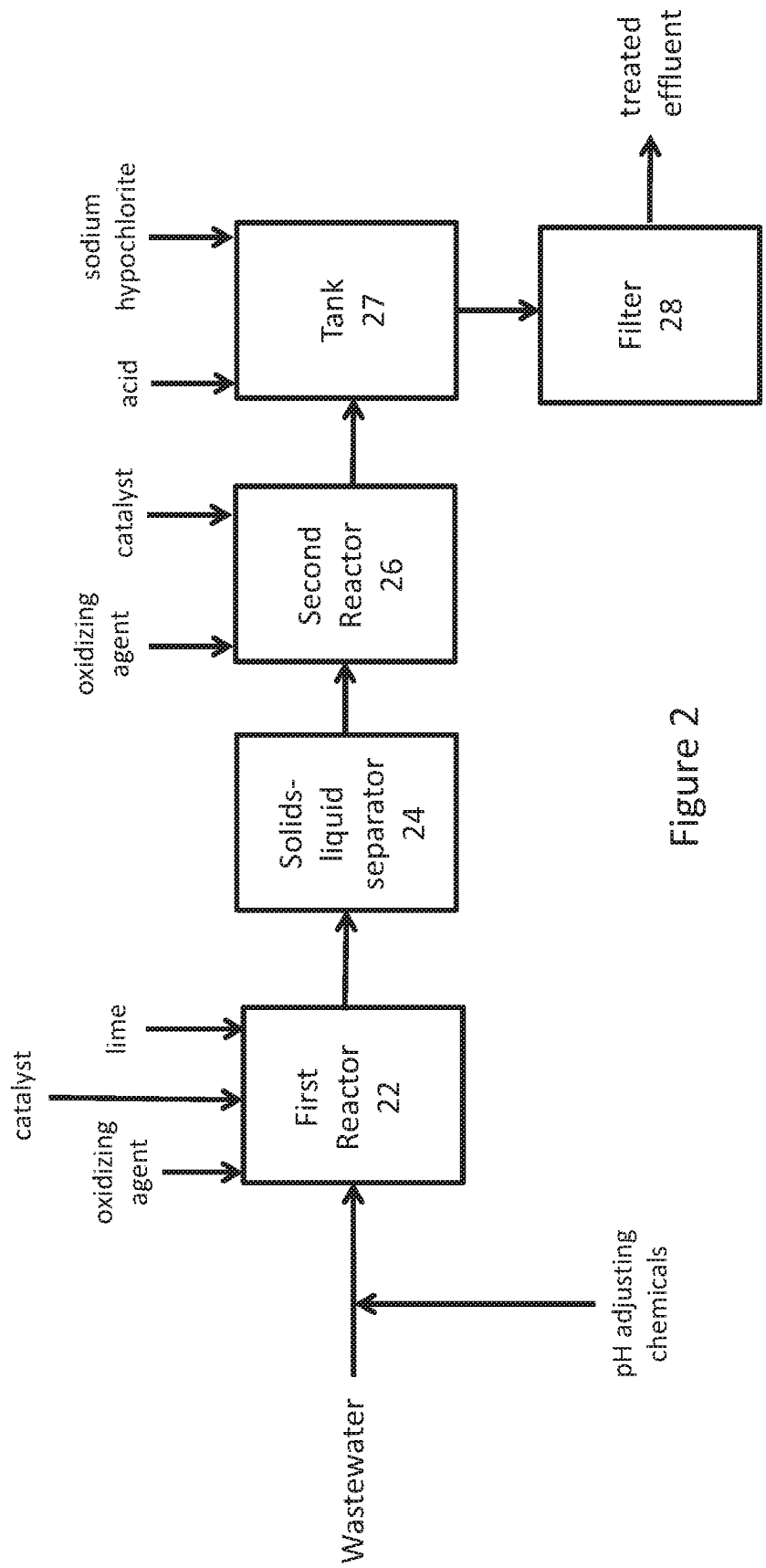
FIG. 2 depicts a second embodiment of the methods described herein.

FIG. 2 depicts another embodiment 20 of the methods described herein. Wastewater containing sulfide is directed to a first reactor 22. An oxidation reagent is mixed with the wastewater stream. At least some of the sulfide in the wastewater stream is oxidized. In a preferred embodiment, the oxidation reagent is hydrogen peroxide. An iron catalyst may also be added in the first reactor 22.

After the sulfide is oxidized, a softening reagent is added to the wastewater. In some embodiments, the softening reagent is lime. The softening agent increases the pH of the wastewater. As a result, hardness compounds precipitate from the wastewater, and the elemental sulfur is converted to sulfide and/or thio-sulfate. The sulfide and/or thio-sulfate adsorbs onto the precipitated hardness compounds.

After the softening step, the wastewater is directed to a solids-liquid separator 24. The precipitated hardness compounds on which sulfide and/or thio-sulfate are adsorbed are removed, producing an effluent that includes residual elemental sulfur.

The effluent is directed to a second reactor 26. An oxidizing reagent is mixed with the effluent. The oxidizing agent may be the same oxidizing reagent as used in the first reactor 22 or may be a different oxidizing reagent. In a preferred embodiment, the oxidizing reagent used in the second reactor is hydrogen peroxide. The oxidizing reagent causes the residual elemental sulfur to be converted to sulfate.

The wastewater stream with sulfate from the second reactor may then be further treated. For example, in some embodiments, the wastewater may have its pH adjusted lower and may be passed through a filter 28. Filter 28 may remove any additional suspended solids. Examples of filters that may be used for Filter 28 include multi media filters, sand filters, microfilters, and ultrafilters. After being treated by filter 28, the wastewater may be further treated by reverse osmosis or nanofiltration for recovery. It may also be released.

In other embodiments, the wastewater may be further treated after leaving second reactor 26 to remove additional contaminants. For example, the wastewater may be sent to tank 27. Sulfuric or hydrochloric acid may be added to adjust the pH to between 7.0 and 8.0. A predetermined dosage of hypochlorite may be added to tank 27 as a disinfectant and to remove ammonia present in the water. The dosage of hypochlorite depends on the water quality. However, the residual free chlorine in the pH adjustment tank may be maintained at 0.5 mg/L to ensure complete breakpoint chlorination. The wastewater may then be filtered via filter 28 as described above.

Figure 3:
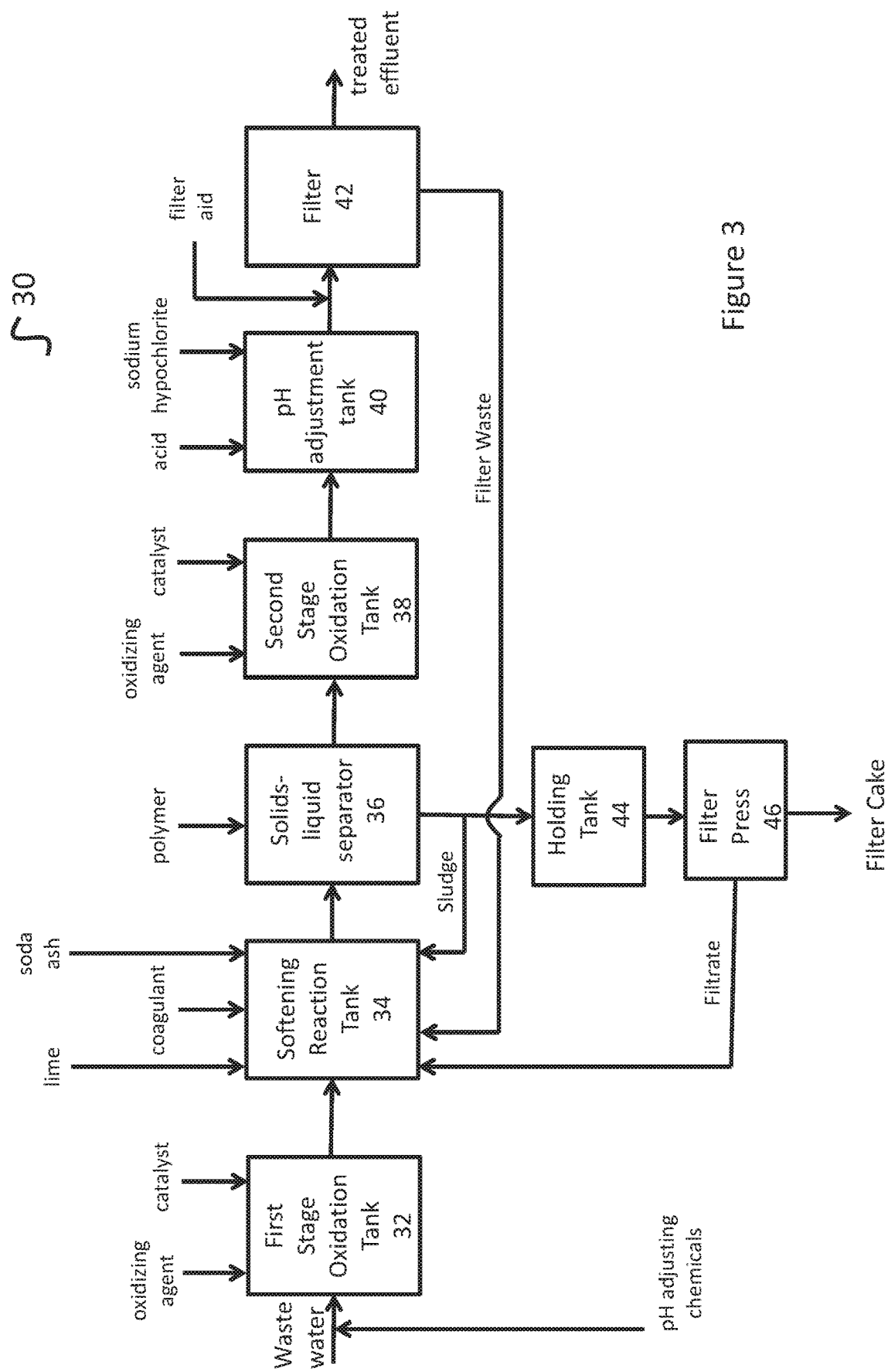
FIG. 3 depicts another embodiment of the methods described herein.

FIG. 3 provides a third embodiment 30 of the methods described herein. Wastewater containing sulfide is provided. If necessary, the pH of the wastewater is adjusted so that the pH is between 7.0 and 8.0. The wastewater is directed to a first stage oxidation tank 32. An oxidizing reagent and an iron catalyst are added to the first stage oxidation tank 32. In preferred embodiments, the oxidizing reagent is hydrogen peroxide and the iron catalyst is ferric chloride or ferric sulfate. Sulfide in the wastewater is oxidized to elemental sulfur as described above.

Effluent from first stage oxidation tank 32 is directed to softening reaction tank 34. Lime is added to adjust the pH to above 10, and preferably to between 10.0 and 10.5. If magnesium removal is desirable, the pH may be raised to between 10.8 and 11.2. If necessary, soda ash may additionally be added. The alkaline conditions result in hardness compounds precipitating. Insoluble elemental sulfur produced in the first stage oxidation tank 32 are further converted to sulfide and thio-sulfate, which will adsorb onto the precipitated hardness. Some embodiments may further include addition of a coagulant to aid in coagulating the precipitated hardness.

The precipitant is removed via a solids-liquids separator 36. Any solids-liquids separator may be utilized. In some embodiments, the solids-liquid separator 36 is a clarifier. In some embodiments, sludge removed in solids-liquid separator 36 may be recycled to softening reaction tank 34, may be directed to a sludge holding tank 44, may be directed to a filter press 46, or may be treated by any combination thereof. In embodiments including a filter press 46, a filter cake may be produced for disposal, while filtrate produced in filter press 46 may be recycled to softening reaction tank 34. Removal of solids via the solids separator includes the removal of sulfide ($S^{2-}$) and/or thio-sulfate adsorbed onto $CaCO_3$ from the wastewater stream. This has an added benefit of reducing the tendency of any membrane separation unit that may optionally be included downstream to foul.

The effluent from solids-liquids separator 36 is directed to a second stage oxidation tank 38. An oxidizing agent is added to second stage oxidation tank 38, oxidizing residual elemental sulfur to sulfate, as discussed above. In a preferred embodiment, the oxidizing agent is hydrogen peroxide. If the pH is less than 10.5, an iron catalyst, such as, for example, ferric chloride or ferric sulfate, may also be added.

After oxidization, the effluent from the second stage oxidation tank is directed to a pH adjustment tank 40. Acid is added to lower the pH to between 7.0 and 8.0. Examples of acids that may be used include, but are not limited to, hydrochloric acid and sulfuric acid. In some embodiments, hypochlorite may further be added to pH adjustment tank 40 to disinfect the water and remove ammonia that may be in the water.

The effluent from the pH adjustment tank 40 is directed to a filter 42. In some embodiments, a filter aid is added prior to filtering. The filter 42 removes residual suspended solids generated in the process. Examples of appropriate filters that may be used include, but are not limited to, multi media filters, sand filters, microfilters, and ultrafilters. After filtration, the treated water may be discharged or further treated, such as by reverse osmosis or nano filtration.

Tests were undertaken using the methods described herein. Equal samples from a common wastewater were treated. One sample was treated with prior art one stage oxidation process, while a second sample was treated the two-stage processes disclosed herein.

The results of those tests are shown below:

TABLE 1

Results in comparison tests between prior art methods and methods disclosed herein.

| Treatment | Hydrogen Peroxide Dosage (as 100% pure) | Effluent Sulfide Concentration (mg/l as $S^{-2}$) | Hydrogen peroxide cost ($/year) | Total Savings (between single and two stage process) |
|---|---|---|---|---|
| Single Stage | | | | |
| Single Stage | 1050 mg/l | <1 (detection limit <0.1) | $13,800,000 | |
| Two Stage | | | | |
| First Stage | 210 mg/l | <1 (detection limit <0.1) | $ 2,800,000 | |
| Second Stage | 200 mg/l | <0.5 (detection limit <0.1) | $ 2,800,000 | |
| Savings ($/year) | | | | $8,200,000 |

As seen in Table 1, for a single stage oxidation process, about 1,050 mg/L of hydrogen peroxide was required to reduce sulfide from 210 mg/L to <0.1 mg/L (sulfide detection limit for the analytical method was <0.1 mg/L), and the associated estimated cost for hydrogen peroxide is US$13.80 MM/year. For a two stage oxidation process, the total hydrogen peroxide requirement was about 410 mg/L to achieve <0.5 mg/L of sulfide (sulfide detection limit for this analytical method was <0.1 mg/L) in the treated water, and the associated estimated cost for hydrogen peroxide is US$5.60 MM/year. Based on a flow of 4,920 gpm and an influent sulfide concentration of 210 mg/L (as $S^{2-}$), the cost for the above two scenarios are estimated. It should be noted, however, that the chemical cost is a function of flow and the water quality. A cost comparison between the two processes indicates that the process discussed in this invention (two stage oxidation, and co-precipitation and adsorption) will save chemical (hydrogen peroxide) cost by more than US$8.0 MM per year.

In another test, synthetic wastewater was prepared with the components shown in Table 2, below:

TABLE 2

Concentrations of contaminants in synthetic wastewater.

| Contaminant | Concentration |
|---|---|
| Calcium (mg/L Ca) | 820 |
| Magnesium (mg/L Mg) | 270 |
| Sodium (mg/L Na) | 1900 |
| Alkalinity (mg/L $CaCO_3$) | 450 |
| Chloride (mg/L Cl) | 4900 |
| Sulfate (mg/L $SO_4$) | 0 |
| TDS (mg/L) | 8500 |

The synthetic wastewater was used to prepare sludge. The synthetic wastewater was further used to test the methods disclosed herein. This sample comprised two liters of the synthetic wastewater disclosed in Table 2. In addition to the components shown in Table 2, the sample further included 200 mg/L sulfide. The second sample was then treated for sulfide removal pursuant to the methods discussed herein. After softening, the supernatant from the softener was split into two samples. One sample was subjected to the second stage oxidation using a peroxide to sulfur ratios of 5:1, while the second sample was subjected to the second stage oxidation using a peroxide to sulfur ratio of 8:1. The results are shown in Table 3, below.

TABLE 3

Results of Two Stage Softening

| | First Stage Oxidation Effluent | Softening Supernatant | 5:1 H2O2 Second Stage Effluent | 8:1 H2O2 Second Stage Effluent |
|---|---|---|---|---|
| TSS (mg/L) | 204 | — | 22 | 17 |
| Dissolved Calcium (mg/L Ca) | 880 | — | — | — |
| Sulfide (mg/L $S^{2-}$) | <1 | <1 | <0.1 | <0.5 |
| Sulfate (mg/L SO4) | 28.7 | 28.6 | 41.1 | 58.4 |
| Sulfur (mg/L S) | 34.3 | 30.4 | 7.9 | <0.1 |

The results of this study confirmed that a 1:1 ratio of hydrogen peroxide to sulfide was sufficient for oxidation to elemental sulfur. Softening was performed and showed to remove the majority of the sulfur according to the analytical analysis of the filter cake. The remaining sulfur in the supernatant was fully oxidized to sulfate using a target hydrogen peroxide ratio of 8:1 (240 mg/L) based on previously obtained sulfur results.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A process for removing sulfide from a wastewater stream comprising:
   a. maintaining or, if necessary, adjusting the pH of the wastewater stream to between 7.0 and 8.0;
   b. mixing a first oxidizing agent with the wastewater stream and oxidizing the sulfide to elemental sulfur;
   c. softening the wastewater stream by mixing lime with the wastewater stream and raising the pH of the wastewater stream to 10.0 or higher, and converting the elemental sulfur to soluble sulfide ($S^{2-}$) and/or thio-sulfate, and precipitating calcium carbonate and adsorbing the sulfide ($S^{2-}$) and/or thio-sulfate onto the calcium carbonate;

d. after softening the wastewater stream, directing the wastewater stream to a solids-liquid separation process and separating the calcium carbonate and adsorbed sulfide ($S^{2-}$) and/or thio-sulfate from the wastewater stream, and producing an effluent that includes residual elemental sulfur; and e. mixing a second oxidizing agent with the effluent from the solids-liquid separator and oxidizing the residual elemental sulfur to sulfate to produce a treated effluent.

2. The process of claim 1, wherein after oxidizing the residual elemental sulfur, filtering the treated effluent and after filtering the treated effluent, processing the treated effluent in a membrane separation process.

3. The process of claim 1, further including mixing an iron catalyst with the wastewater stream and the first oxidizing agent to enhance the oxidation reaction kinetics.

4. The process of claim 1 wherein the first oxidizing agent and the second oxidizing agent are hydrogen peroxide.

5. The process of claim 1, wherein softening the wastewater stream further includes mixing soda ash with the wastewater stream.

6. The method of claim 1 wherein, after converting residual elemental sulfur to sulfate, processing the treated effluent in a membrane separation unit, and wherein the removal of sulfide ($S^{2-}$) and/or thio-sulfate from the wastewater stream reduces the tendency of the membrane separation unit to foul.

7. The process of claim 1, wherein after converting residual elemental sulfur to sulfate, reducing the pH of the effluent to approximately 7.0 to approximately 8.0.

8. The process of claim 1, wherein after converting the residual elemental sulfur to sulfate, mixing hypochlorite with the treated effluent to disinfect the treated effluent and remove at least some of any ammonia present in the treated effluent.

9. The process of claim 1, further including:
mixing an iron catalyst with the wastewater stream and the first oxidizing agent to enhance the oxidation reaction kinetics;
after oxidizing the residual elemental sulfur, filtering the treated effluent; and
after filtering the treated effluent, processing the treated effluent in a membrane separation process.

10. The process of claim 1, further including:
mixing an iron catalyst with the wastewater stream and the first oxidizing agent to enhance the oxidation reaction kinetics;
after converting residual elemental sulfur to sulfate, reducing the pH of the treated effluent to approximately 7.0 to approximately 8.0;
after reducing the pH of the treated effluent, filtering the treated effluent; and
after filtering the treated effluent, processing the treated effluent in a membrane separation process.

11. A two-step oxidation process for removing sulfide from a wastewater stream, comprising:
in the first step:
mixing an oxidation reagent with the wastewater stream and oxidizing at least some of the sulfide primarily to elemental sulfur;
after oxidizing the sulfide to primarily elemental sulfur, adding a softening reagent to the wastewater stream and increasing the pH of the wastewater stream which converts the elemental sulfur to soluble sulfide ($S^{2-}$) and/or thio-sulfate, and precipitating a hardness compound from the wastewater stream and adsorbing the soluble sulfide and/or thio-sulfate onto the hardness compound;
after the first step:
directing the wastewater stream to a solids-liquid separator and removing the hardness compound having the sulfide and/or thio-sulfate adsorbed thereon; and producing an effluent that includes residual elemental sulfur;
in the second step:
mixing the oxidizing reagent or another oxidizing reagent with the effluent from the solids-liquid separator and causing the residual elemental sulfur to be converted to sulfate;
after the second step, further treating the wastewater stream or discharging the wastewater stream.

12. The method of claim 11, wherein further treating the wastewater stream includes adjusting the pH of the wastewater stream to between 7.0 and 8.0.

13. The method of claim 11, wherein further treating the wastewater stream includes subjecting the wastewater stream to a filtration process.

14. The method of claim 11, further including:
recycling at least some of the removed hardness compounds to mix with the softening reagent and the wastewater stream;
pressing at least some of the removed hardness compounds to produce a filtrate and a filter cake; and
recycling at least some of the filtrate and mixing the filtrate with the softening reagent and the wastewater stream.

* * * * *